July 25, 1933.  C. C. FARMER  1,919,421
SNAP ACTING VALVE DEVICE
Filed Oct. 8, 1931
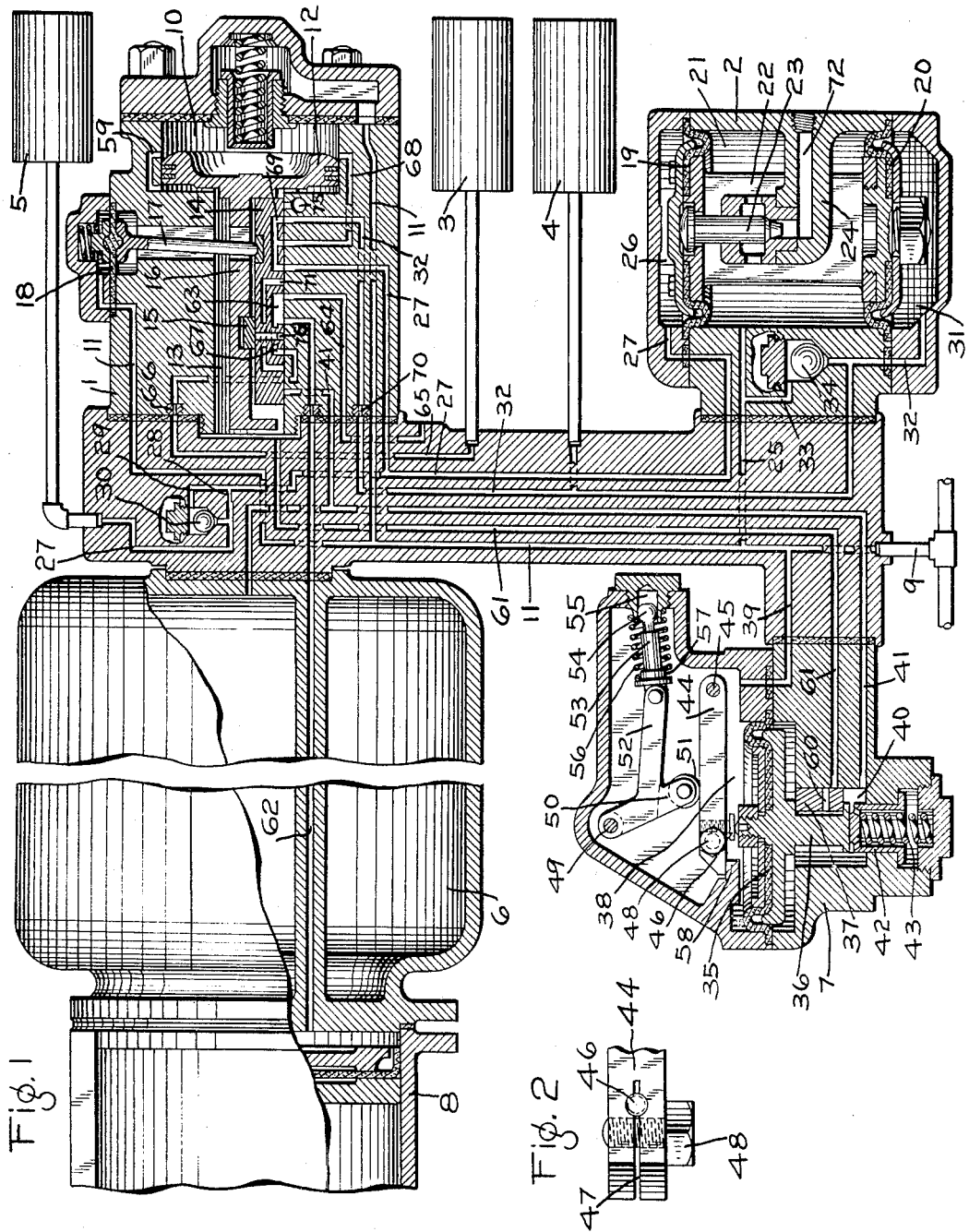
INVENTOR.
CLYDE C. FARMER
By Wm. W. Cady
ATTORNEY.

Patented July 25, 1933

1,919,421

UNITED STATES PATENT OFFICE

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA

SNAP-ACTING VALVE DEVICE

Application filed October 8, 1931. Serial No. 567,599.

This invention relates to fluid pressure brakes, and more particularly to a fluid pressure brake equipment for use on a caboose or rear car of a train.

With the increase in train lengths, the difficulty of applying the brakes without causing excessive shocks, due to the running in of the slack between cars, before the brakes are applied on cars at the rear end of the train, is correspondingly increased.

To obviate the above difficulty, it has heretofore been proposed to provide means on the rear car or caboose for locally effecting a reduction in brake pipe pressure, in which the valve chamber of the brake controlling valve device is normally cut off from the auxiliary reservoir and a valve mechanism is provided which is operated upon a light reduction in brake pipe pressure for opening communication from the auxiliary reservoir to the valve chamber, so as to effect a positive movement of the brake controlling valve device upon a reduction in brake pipe pressure.

One object of my invention is to provide an improved valve mechanism of the above character which operates with a prompt, positive, and snap-like-action upon a reduction in brake pipe pressure.

Another object of my invention is to provide a quick acting valve mechanism for use generally in fluid pressure brake systems.

In the accompanying drawing; Fig. 1 is a diagrammatic view, mainly in section of a fluid pressure brake equipment embodying my invention; and Fig. 2 a detail view of a portion of the lever employed in the valve mechanism for controlling the supply of fluid from the auxiliary reservoir to the triple valve chamber.

As shown in the drawing, the fluid pressure brake equipment, as applied to a caboose or rear car of a train, may comprise a triple valve device 1, an equalizing discharge valve device 2, an expansion chamber or reservoir 3, a stabilizing reservoir 4, an equalizing reservoir 5, an auxiliary reservoir 6, a valve device 7, a brake cylinder 8, and a brake pipe 9.

The triple valve device 1, as shown in the drawing, may be of the type in which the piston makes full traverse in effecting a service application of the brakes, and comprises a casing having a piston chamber 10 connected through a passage 11, with the brake pipe 9 and containing a piston 12, and having a valve chamber 13 containing a main slide valve 14 and a graduating slide valve 15 adapted to be operated by piston 12, through a stem 16.

The slide valve 14 may be provided with means to insure that the slide valve will be maintained on its seat at all times, such as a rocking pin 17, engaging the slide valve and bearing on a flexible diaphragm 18, which is subject on one side to brake pipe pressure, as supplied through passage 11, and on the opposite side to the pressure in valve chamber 13.

The equalizing discharge valve device 2 may comprise a casing in which there is mounted, in spaced relation to each other, flexible diaphragms 19 and 20 of equal area. Contained in chamber 21 intermediate the diaphragms 19 and 20 is a spacer member 22 which carries a discharge valve 23 adapted to cooperate with a valve seat provided on a projecting portion 24 of the casing.

The chamber 21 is constantly connected through passage 25 with the brake pipe. The chamber 26 at the upper face of diaphragm 19 is connected, through a passage 27, with the equalizing reservoir 5, the passage 27 having a restriction 28. Connected to passage 27 at opposite sides of the restriction 28 is a passage 29 containing a check valve 30.

The chamber 31 at the under side of diaphragm 20 is connected through a passage 32 with the stabilizing reservoir 4, and passage 32 also leads to the seat of slide valve 14. A passage 33 containing a check valve 34, connects passage 32 with passage 25.

The valve device 7 is for the purpose of controlling the supply of fluid under pressure from the auxiliary reservoir 6 to the valve chamber 13, while the triple valve device is in release position and a reduction in brake pipe pressure is effected and may comprise a casing in which a flexible diaphragm 35 is mounted. Associated with the diaphragm is a stem 36 adapted to operate a slide valve 37. The chamber 38 at the upper face of the diaphragm is connected by passage 39 with brake pipe passage 11 and valve chamber 40 at the opposite side of the diaphragm is connected to a passage 41 leading to the auxiliary reservoir 6 and also to the seat of slide valve 14.

The piston stem 36 is urged upwardly by a movable member 42, acted upon by a coil spring 43. According to my invention, means are provided for ensuring the prompt, positive, and snap-like movement of the diaphragm 35 and the valve 37 in either direction and for this purpose I provide a lever 44, pivotally mounted in chamber 38 on a pin 45 and having a bore at one end in which is mounted an adjustable pin 46 adapted to engage the diaphragm assembly.

The lever 44 is provided with a slit 47, as shown in Fig. 2, crossing the bore of the pin 46 and a clamping bolt 48, having screw-threaded engagement in the lever, is provided for clamping the split portions of the lever to the pin 46, when the pin has been adjusted to the desired position.

Pivotally mounted on a pin 49 in chamber 38 is a member having an arm 50 carrying a roller 51 adapted to engage the upper face of the lever 44. Said member is also provided with an arm 52 having a guide member 53 pivotally connected to its outer end. Said guide member is provided at its outer end with a ball shaped portion 54 which is guided in a bore 55 of the casing. A coil spring 56 is interposed between a collar 57 of the member 53 and the casing. The free end of the lever 44 is adapted to engage a shoulder 58 provided on the valve casing, so as to limit the downward movement of the lever.

In operation, when the brake pipe 9 is supplied with fluid under pressure, the triple valve piston 12 is shifted to its release position, as shown in Fig. 1. In release position, fluid under pressure supplied through passage 11 to piston chamber 10 flows through the feed groove 59 around piston 12 to valve chamber 13.

Fluid under pressure also flows from the brake pipe 9, through passage 39 to chamber 38 of the valve device 7, and since there is no fluid pressure in the auxiliary reservoir 6 and in valve chamber 40, the diaphragm 35 will be shifted downwardly by brake pressure, until a port 60 in the slide valve 37 registers with passage 61 leading to valve chamber 13.

Fluid under pressure will then flow from valve chamber 13 to valve chamber 40 and thence through passage 41 to the auxiliary reservoir 6. When the pressure in valve chamber 40 and the auxiliary reservoir 6 has been increased nearly to brake pipe pressure, the spring 43 operates to shift the stem 36 upwardly, so that the valve 37 assumes the position shown in Fig. 1, in which communication between the valve chamber 13 and the valve chamber 40 is cut off.

Fluid under pressure from the brake pipe also flows through passage 25 to the chamber 21 of the equalizing discharge valve device 2. With the main slide valve 14 in release position, the brake cylinder 8 is connected to the atmosphere, through passage 62, cavity 63 in slide valve 14 and exhaust passage 64, and the expansion reservoir 3 is connected to the atmosphere, through passage 65, containing a choke plug with a restricted flow port 66, and a port 67 in slide valve 14, which opens into the exhaust cavity 63.

In release position of the triple valve parts, fluid under pressure flows from piston chamber 10 through passage 68 and cavity 69 in slide valve 14 to passage 27, leading to chamber 26, and also through cavity 69 to passage 32, leading to the stabilizing reservoir 4 and chamber 31 below the diaphragm 20 of the discharge valve device 2. The flow of fluid to chamber 31 is restricted by the restricted passage 70, in a choke plug in passage 32, so that since the check valve 34 prevents flow through passage 33 from the brake pipe to chamber 31, the rate of increase in pressure in chamber 31 is governed entirely by the rate of flow through the restricted port 70. Fluid under pressure supplied to passage 27 also flows through the restricted port 28 to the equalizing reservoir 5.

Due to the restricted port 28, the pressure builds up in diaphragm chamber 26 at a faster rate than in the equalizing reservoir 5, and due to the restricted port 70, the pressure in diaphragm chamber 31 builds up at a slower rate than in chamber 26. As a result, during the charging period, the pressure in chamber 26 is always higher than the pressure in chamber 31 and consequently the diaphragms 19 and 20 are subject to a differential pressure which operates on the valve 23 to maintain the valve seated, thus preventing flow of fluid from the brake pipe to the atmosphere.

In order to effect a service application of the brakes, a gradual reduction in brake pipe pressure is made in the usual manner. On cars at the front end of the train, the triple valves will be operated by the reduction in brake pipe pressure to supply fluid under pressure to the brake cylinder; but on cars at the rear of the train, the rate of reduction in brake pipe pressure may not in some cases be sufficient to cause the triple valve to move to service application position. When, however, the caboose or rear car of the train is equipped with my apparatus, as hereinbefore described, if the brake pipe pressure is reducing at a slower than the service rate, fluid under pressure from the valve chamber 13 will flow to the triple valve piston chamber 10 through the feed groove 59.

In this situation, fluid under pressure is prevented from flowing from the auxiliary reservoir 6 to the valve chamber 13 by the slide valve 36 of the valve device 7, so that a reduction in auxiliary reservoir pressure is prevented. The pressure, however, in chamber 38 of said valve device (which is connected to the brake pipe), reduces with the brake pipe, while the auxiliary reservoir pressure in valve chamber 40 on the opposite side of diaphragm 35, remains undisturbed.

When the pressure in chamber 38 has been reduced a small predetermined amount, such as two pounds, for example, the diaphragm 35 will move upwardly, also moving the lever 44. The movement of lever 44 starts movement of the roller 51 on the upper surface of the lever 44, causing a rocking of the arms 50 and 52 and a compression of the spring 56. As the roller 51 moves toward the right, the leverage ratio of the forces acting on the spring 56 is increased at a faster rate than the compression force of the spring 56 increases, with the result that once the diaphragm 35 starts moving the lever 44 and the roller 51, the effective force tending to move the diaphragm increases. A prompt, positive and snap-like movement of the diaphragm 35 is thus assured, although the brake pipe pressure may be reducing at the rear end of the train at a slow rate.

The upward movement of the diaphragm 35 causes the slide valve 36 to be correspondingly moved to a position in which the passage 61 is uncovered by the slide valve. Fluid under pressure is then supplied from valve chamber 40 and the auxiliary reservoir 6 to the valve chamber 13 at a considerably faster rate than fluid can flow from valve chamber 13 through feed groove 59 to piston chamber 10, so that the pressure in valve chamber 13 is increased sufficiently to cause the movement of piston 12 to the right.

Movement of piston 12 first causes movement of graduating valve 15, so as to uncover the service port 76 in the main slide valve 14. The main slide valve 14 is then shifted to service position in which port 76 registers with passage 62. Slightly in advance of the registration of port 41 with passage 62, the passage 41 is uncovered by the movement of the main slide valve 14, so that the auxiliary reservoir 6 is now directly connected to the valve chamber 13, independently of the position of the slide valve 36 of the valve device 7.

In service position, fluid under pressure is thus supplied from the auxiliary reservoir 6 to the brake cylinder 8, through passage 62. Also in service position, cavity 71 in slide valve 14, connects passage 65 with passage 27, so that the expansion reservoir 3 is connected to the equalizing reservoir 5 and to the chamber 26 of the discharge valve device 2. The pressure in the chamber 26 and in the equalizing reservoir 5 is thus reduced by flow to the expansion chamber 3, so that the pressure in chamber 31 and the stabilizing reservoir 4 operates to shift the diaphragms 19 and 20 upwardly, so that the discharge valve 23 is unseated, permitting the venting of fluid under pressure from chamber 21 and the brake pipe to atmospheric exhaust passage 72.

The fluid pressure in chamber 31 and the stabilizing reservoir 4 reduces with the brake pipe, by flow from passage 32, through passage 33, past the check valve 34 to passage 25, so that when the pressure in the brake pipe and in chamber 31 reduces to a point slightly below the pressure at which the equalizing reservoir 5 equalizes into the expansion reservoir 3, the equalized pressure in chamber 26 will operate the diaphragms 19 and 20 to close the valve 23 and thus cut off the further venting of fluid from the brake pipe.

When the discharge valve device 2 operates as above described, the brake pipe pressure is preferably reduced at a rate corresponding with the rate at which the brake pipe pressure is reduced at the head end of the train, thus insuring a more nearly simultaneous reduction in brake pipe pressure throughout the train, and a consequent more uniform braking action.

When the slide valve 14 is in service position, cavity 69 is connected to an atmospheric exhaust port 75, so that the valve 14 is subjected to an unbalanced fluid pressure in the valve chamber 13, causing the valve to be more firmly held to its seat. This prevents accidental movement of the slide valve 14 by piston 12, due to surges in brake pipe pressure.

To release the brakes, the brake pipe pressure is increased in the usual manner, causing the apparatus to be recharged with fluid under pressure and to operate to connect the brake cylinder and the expansion reservoir to the atmosphere, in the same manner as described in connection with the initial charging of the apparatus.

When the brake pipe pressure is increased in releasing the brakes, the fluid pressure in chamber 38 of the valve device 7 is correspondingly increased, and when the diaphragm 35 starts to move downwardly from its uppermost position and the roller 51 is moved by spring 56 toward the left on the lever 44. The leverage ratio decreases at a faster rate than the force of the spring 56 decreases, so that the effective force tending to move the diaphragm downwardly progressively increases, with the result that a prompt positive downward movement of the diaphragm 35 is effected.

In this movement, the valve 37 is moved, so that port 60 registers with passage 61, permitting the recharge of the auxiliary reservoir from the valve chamber 13, as hereinbefore described.

The apparatus has been described with the triple valve device 1 operating to supply fluid under pressure to the brake cylinder to effect a service application of the brakes. It will be seen, however, that the apparatus may be applied to a caboose or rear car having the usual fluid pressure brake equipment, including the usual triple valve device for controlling the supply of fluid to the brake cylinder.

In this case, the triple valve device 1 of my apparatus may be employed merely to effect a reduction in brake pipe pressure, the usual triple valve device operating to control the pressure in the brake cylinder. When, as in the above case, the brake cylinder is not attached to my apparatus, a chamber or dummy brake cylinder should be substituted for the usual brake cylinder, so that the triple valve device 1 of my apparatus will operate the same as though the usual brake cylinder were associated therewith.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a brake controlling valve device subject to the opposing pressures of the brake pipe and a chamber, a normally charged reservoir, a valve mechanism operated upon a predetermined reduction in brake pipe pressure for supplying fluid under pressure from said reservoir to said chamber, and means for accelerating the action of said valve mechanism.

2. In a fluid pressure brake, the combination with a brake pipe, of a brake controlling valve device subject to the opposing pressures of the brake pipe and a chamber, a normally charged reservoir, and a valve mechanism for controlling the supply of fluid under pressure from said reservoir to said chamber, comprising a movable abutment subject to the opposing pressures of the brake pipe and said reservoir and a slide valve operated by said abutment upon a reduction in brake pipe pressure for establishing communication from the reservoir to the chamber.

3. In a fluid pressure brake, the combination with a brake pipe, of a brake controlling valve device subject to the opposing pressures of the brake pipe and a chamber, a normally charged reservoir, and a valve mechanism for controlling the supply of fluid under pressure from said reservoir to said chamber, comprising a movable abutment subject to the opposing pressures of the brake pipe and said reservoir and a slide valve controlling the only communication between the reservoir and the chamber and operated by said abutment upon a reduction in brake pipe pressure to open said communication.

4. In a fluid pressure brake, the combination with a brake pipe, of a brake controlling valve device subject to the opposing pressures of the brake pipe and a chamber, a normally charged reservoir, a valve mechanism operated upon a reduction in brake pipe pressure for supplying fluid under pressure from said reservoir to said chamber, a spring opposing the movement of said abutment, and means operating to reduce the force with which the spring opposes movement of said abutment, as the abutment moves.

5. A quick acting valve mechanism for fluid pressure brake systems comprising a movable abutment subject to the opposing pressures in chambers at opposite sides thereof, a valve operated by said abutment upon a reduction in fluid pressure in one of said chambers, a spring for opposing movement of said abutment, a member operatively connected to said spring, and a lever through which said member transmits the pressure of the spring to said abutment.

6. A quick acting valve mechanism for fluid pressure brake systems comprising a movable abutment subject to the opposing pressures in chambers at opposite sides thereof, a valve operated by said abutment upon a reduction in fluid pressure in one of said chambers, a spring for opposing movement of said abutment, a member operatively connected to said spring, and a lever through which said member transmits the pressure of the spring to said abutment, said member being disposed at an angle to said lever.

7. A quick acting valve mechanism for fluid pressure brake systems comprising a movable abutment subject to the opposing pressures in chambers at opposite sides thereof, a valve operated by said abutment upon a reduction in fluid pressure in one of said chambers, a spring for opposing movement of said abutment, a member operatively connected to said spring, and a lever movable with said abutment, on which said member has sliding engagement, whereby the lever ratio is varied as said abutment and thereby said lever is moved.

8. A quick acting valve mechanism for fluid pressure brake systems comprising a valve, a movable abutment operated upon a reduction in fluid pressure for operating said valve, a lever movable with said abutment, a member engaging said lever, the engaging point of which is shifted as the abutment moves said lever, and a spring for opposing movement of said member.

9. A quick acting valve mechanism for fluid pressure brake systems comprising a valve, a movable abutment operated upon a reduction in fluid pressure for operating said valve, a lever movable with said abutment, a member engaging said lever, said member being moved by said lever upon movement of the abutment, so that the point of engagement of said lever with said member is shifted, and a spring for opposing movement of said member.

CLYDE C. FARMER.